United States Patent
Sato et al.

(10) Patent No.: US 7,832,642 B2
(45) Date of Patent: Nov. 16, 2010

(54) BAR-CODE READING APPARATUS AND COMPUTER-READABLE MEDIUM

(75) Inventors: Takao Sato, Ome (JP); Tetsuya Kuromatsu, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/079,148

(22) Filed: Mar. 25, 2008

(65) Prior Publication Data

US 2008/0245871 A1    Oct. 9, 2008

(30) Foreign Application Priority Data

Mar. 27, 2007 (JP) .............................. 2007-082515
Mar. 27, 2007 (JP) .............................. 2007-082520

(51) Int. Cl.
*G06K 5/04*     (2006.01)
*G06K 9/00*     (2006.01)

(52) U.S. Cl. ................................ 235/462.12

(58) Field of Classification Search ............ 235/462.12, 235/462.16; 396/52, 53, 55; 348/208.1, 348/208.99, 208.2, 208.4, 208.16, 208.5–208.7
See application file for complete search history.

(56) References Cited

U.S. PATENT DOCUMENTS

| | | | | |
|---|---|---|---|---|
| 4,973,829 A | * | 11/1990 | Ishida et al. | 235/462.12 |
| 5,028,772 A | * | 7/1991 | Lapinski et al. | 235/462.12 |
| 5,045,677 A | * | 9/1991 | Okamura | 235/462.12 |
| 5,296,691 A | * | 3/1994 | Waldron et al. | 235/462.12 |
| 5,369,265 A | | 11/1994 | Adachi et al. | |
| 5,457,308 A | * | 10/1995 | Spitz et al. | 235/462.12 |
| 5,821,519 A | * | 10/1998 | Lee et al. | 235/462.27 |
| 5,942,740 A | * | 8/1999 | Watanabe et al. | 235/462.07 |

(Continued)

FOREIGN PATENT DOCUMENTS

DE    196 44 109 A1    5/1997

(Continued)

OTHER PUBLICATIONS

Extended European Search Report dated Jul. 18, 2008, issued in a counterpart European Application.

(Continued)

*Primary Examiner*—Daniel A Hess
*Assistant Examiner*—Suezu Ellis
(74) *Attorney, Agent, or Firm*—Holtz, Holtz, Goodman & Chick, PC

(57) ABSTRACT

A bar-code reading apparatus includes a reading section to read a bar-code a plurality of times to obtain multiple pieces of bar-code image data; a storage section to store the pieces of bar-code image data; a detection section to detect a moving state of the reading section in a three-dimensional space during a reading operation of the bar-code; a correction section to correct the pieces of bar-code image data stored in the storage section into pieces of bar-code image data which are obtained if the bar-code is read when the reading section is at a preset reference position with respect to the bar-code, based on the moving state detected by the detection section; a synthesis section to synthesize the pieces of bar-code image data corrected by the correction section to produce synthesized image data; and a decode section to decode the synthesized image data.

10 Claims, 18 Drawing Sheets

U.S. PATENT DOCUMENTS

| | | | |
|---|---|---|---|
| 6,081,261 A | | 6/2000 | Wolff et al. |
| 6,267,293 B1 * | | 7/2001 | Dwinell et al. .......... 235/462.12 |
| 6,394,352 B1 * | | 5/2002 | De Renzis ............. 235/462.12 |
| 6,560,741 B1 * | | 5/2003 | Gerety et al. ................ 714/752 |
| 6,669,091 B2 * | 12/2003 | Sharpe et al. .......... 235/462.12 |
| 6,729,547 B1 | | 5/2004 | Charlier et al. |
| 7,077,319 B2 * | | 7/2006 | Schnee et al. ............ 235/462.1 |
| 7,416,127 B2 * | | 8/2008 | Page ..................... 235/462.45 |
| 7,564,482 B2 * | | 7/2009 | Clarke et al. ............. 348/208.1 |
| 7,643,062 B2 * | | 1/2010 | Silverstein et al. ....... 348/208.4 |
| 2003/0076408 A1 * | | 4/2003 | Dutta .......................... 348/61 |
| 2005/0064913 A1 * | | 3/2005 | Kim ........................... 455/567 |
| 2005/0167498 A1 | | 8/2005 | Ito et al. |
| 2007/0146489 A1 * | | 6/2007 | Kosako et al. ........... 348/208.7 |

FOREIGN PATENT DOCUMENTS

JP       07-057035 A      3/1995

OTHER PUBLICATIONS

Extended International Search Report dated Aug. 5, 2009 issued in counterpart European Patent application No. 09008776.8.

* cited by examiner

FIG. 5
IMAGE DATA OF BAR-CODE TO BE READ
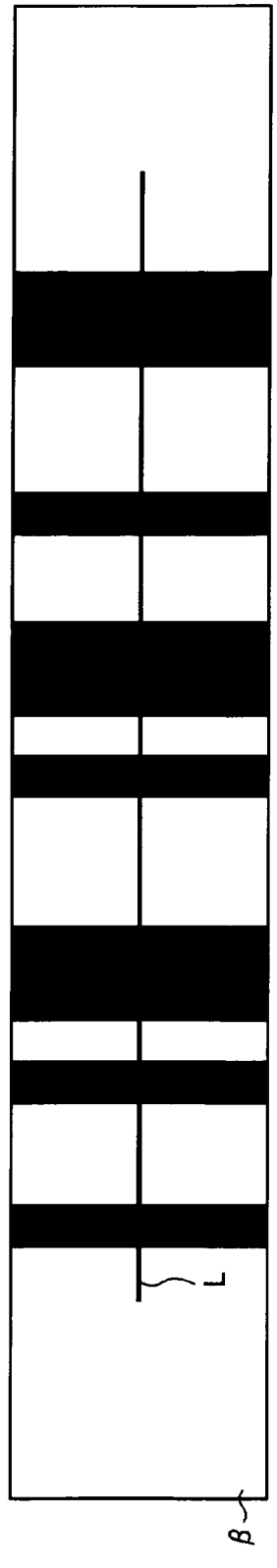
IMAGE DATA RECOGNIZED BY READING SECTION

FIG. 8
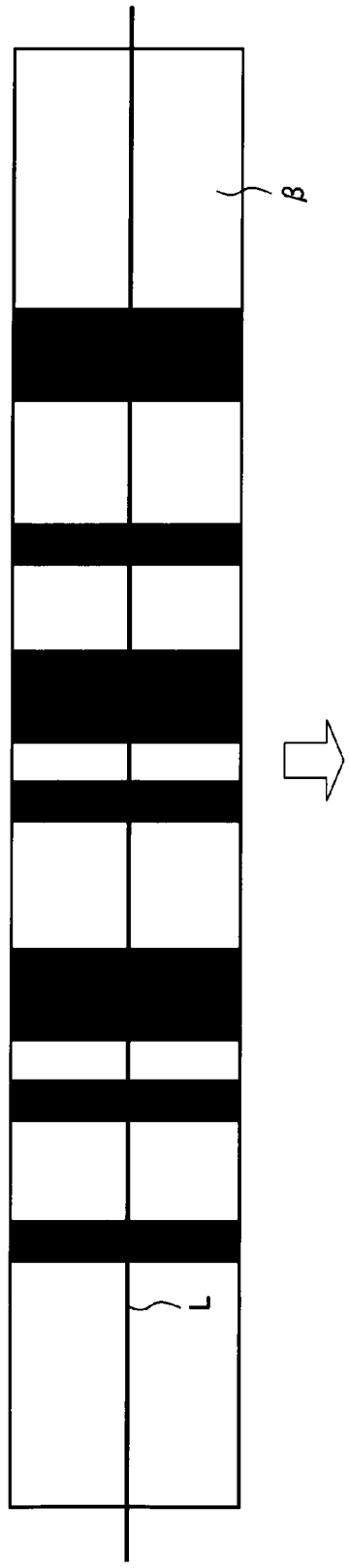
IMAGE DATA OF BAR-CODE TO BE READ
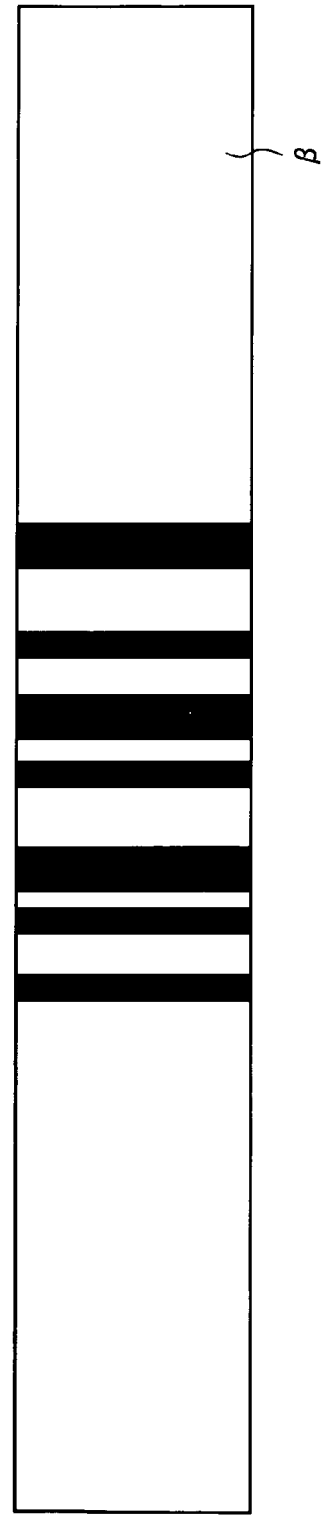
IMAGE DATA RECOGNIZED BY READING SECTION

FIG. 11
IMAGE DATA OF BAR-CODE TO BE READ
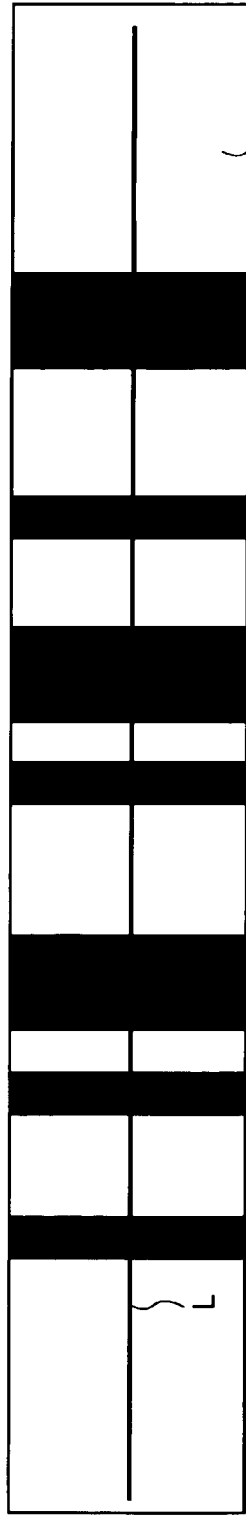
IMAGE DATA RECOGNIZED BY READING SECTION
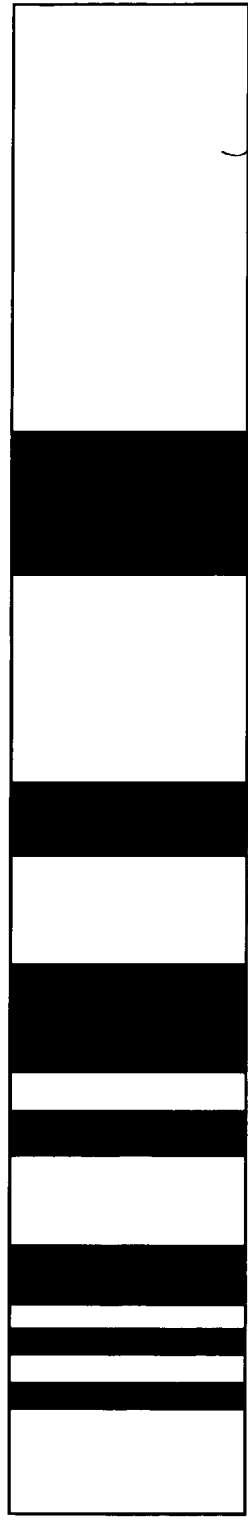

FIG. 14
IMAGE DATA OF BAR-CODE TO BE READ
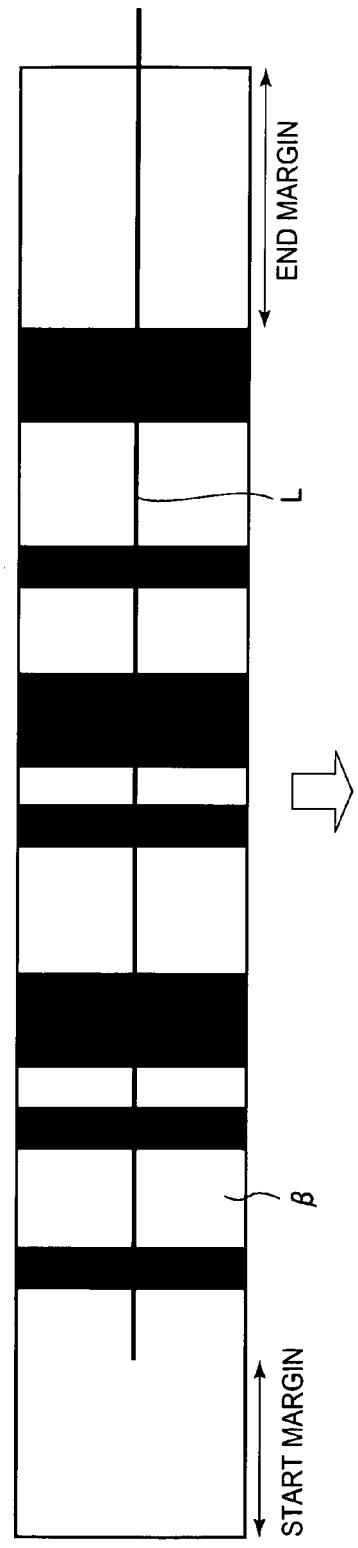
IMAGE DATA RECOGNIZED BY READING SECTION
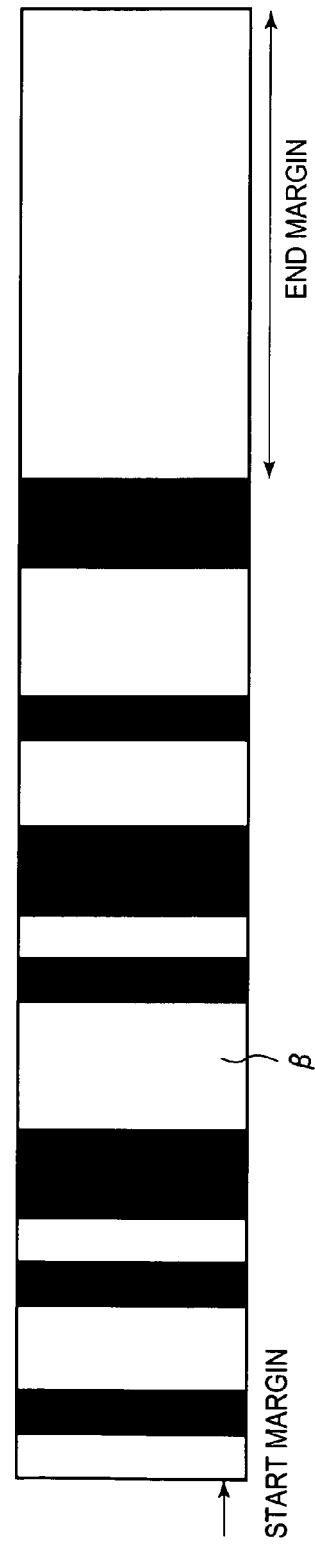

FIG. 17
IMAGE DATA OF BAR-CODE TO BE READ
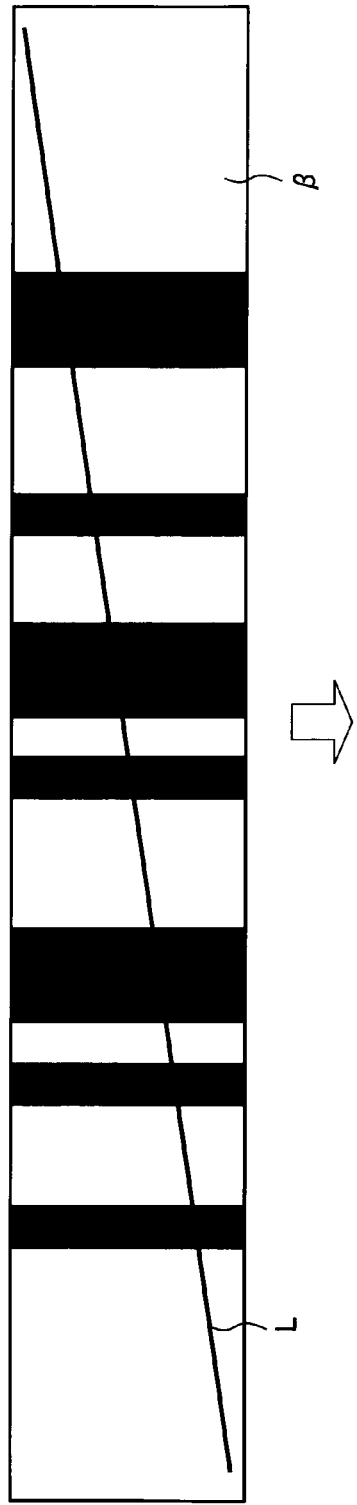
IMAGE DATA RECOGNIZED BY READING SECTION
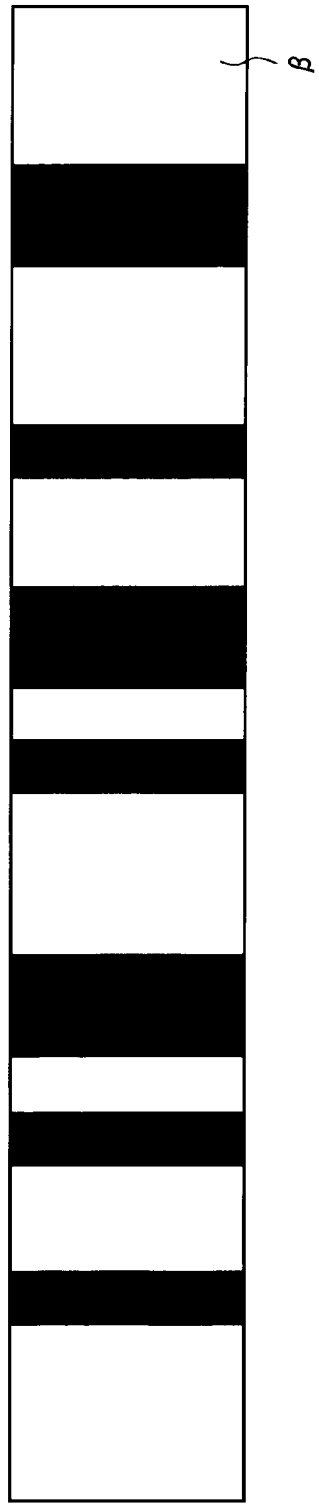

BAR-CODE READING APPARATUS AND COMPUTER-READABLE MEDIUM

BACKGROUND OF THE INVENTION

1. Field of the Invention

The present invention relates to a bar-code reading apparatus and a computer-readable medium.

2. Description of Related Art

When a defective bar-code (see FIG. 24) which is poor in printing quality or which is partially damaged is read by a one-dimensional scanner having an optical source such as laser light, the bar-code may not be decoded because it cannot be correctly read depending on a position where light is irradiated. Since a bar-code is actually read in such a way that a user holds a scanner in her/his hand, various positions on a surface of the bar-code are read due to the movement of the hand of the user. For this reason, when the defective bar-code as shown in FIG. 24 is read, as shown in FIG. 25, multiple pieces of image data obtained by a plurality of reading operations having different light irradiation positions (irradiation lines) depending on the movement of the hand of the user are stored in a memory, the multiple pieces of image data are synthesized to produce accurate image data by combining the pieces of image data, and then a decode process is carried out (for example, see Japanese Patent Application Laid-Open No. 7-57035).

As described above, however, since the bar-code reading operation is carried out in such a way that a user holds a scanner in her/his hand, a light irradiation position during the reading operation variably changes due to the movement of the hand of the user. For example, the light irradiation position not only vertically moves as shown in FIG. 25 but also moves in an alignment direction of bars or is inclined with respect to the alignment direction. Therefore, if the multiple pieces of image data obtained by a plurality of reading operations are synthesized without modification, an accurate reading result cannot be obtained.

In order to obtain data of a bar-code having a width larger than a read range of a scanner, a user must scan the bar-code while moving the scanner with respect to a surface of the bar-code. In a conventional technique, in order to obtain bar-code data by scanning the wide bar-code, a user scans the bar-code at a predetermined scanning rate (for example, 100 scans/second) while moving the scanner in an alignment direction of bars. Each time the scan is performed, pattern matching for the bar-code is carried out, and synthesis is carried out little by little on the basis of the matched parts (for example, see Japanese Patent Application Laid-Open No. 7-57035).

However, because the pattern matching for a bar-code is carried out every time the scan is performed, the numbers of the pattern matching and the synthesis process increase as a moving distance of a scanner per scan becomes short. Hence, there arises a problem that processing efficiency is reduced.

SUMMARY OF THE INVENTION

It is, therefore, a main object of the present invention to enhance efficiency of a synthesis process of bar-code data and to enable an accurate synthesis process by changing image data of a bar-code into image data which is obtained if the bar-code is read when a reading section is at a reference position with respect to the bar-code before carrying out the synthesis process.

According to a first aspect of the present invention, there is provided a bar-code reading apparatus comprising: a reading section to read a bar-code a plurality of times to obtain multiple pieces of bar-code image data; a storage section to store the pieces of bar-code image data obtained by the reading section; a detection section to detect a moving state of the reading section in a three-dimensional space during a reading operation of the bar-code; a correction section to correct the pieces of bar-code image data stored in the storage section into pieces of bar-code image data which are obtained if the bar-code is read when the reading section is at a preset reference position with respect to the bar-code, based on the moving state detected by the detection section; a synthesis section to synthesize the pieces of bar-code image data corrected by the correction section to produce synthesized image data; and a decode section to decode the synthesized image data produced by the synthesis section.

According to a second aspect of the present invention, there is provided a computer-readable medium embodying a program causing a computer to function as: a reading section to read a bar-code a plurality of times to obtain multiple pieces of bar-code image data; a storage section to store the pieces of bar-code image data obtained by the reading section; a detection section to detect a moving state of the reading section in a three-dimensional space during a reading operation of the bar-code; a correction section to correct the pieces of bar-code image data stored in the storage section into pieces of bar-code image data which are obtained if the bar-code is read when the reading section is at a preset reference position with respect to the bar-code, based on the moving state detected by the detection section; a synthesis section to synthesize the pieces of bar-code image data corrected by the correction section to produce synthesized image data; and a decode section to decode the synthesized image data produced by the synthesis section.

According to a third aspect of the present invention, there is provided a bar-code reading apparatus comprising: a reading section to sequentially read a bar-code with a movement of a read range with respect to the bar-code to obtain multiple pieces of bar-code data; a storage section to store the pieces of bar-code data obtained by the reading section; a detection section to detect a moving state of the reading section in a three-dimensional space; a calculation section to calculate a moving distance of the reading section required for synthesis of the pieces of bar-code data based on the moving state detected by the detection section; a synthesis section to synthesize the pieces of bar-code data stored in the storage section to produce synthesized bar-code data by combining bar-code data obtained before the reading section moves the moving distance with bar-code data obtained after the reading section moves the moving distance; and a decode section to decode the synthesized bar-code data produced by the synthesis section.

According to a fourth aspect of the present invention, there is provided a computer-readable medium embodying a program causing a computer to function as: a reading section to sequentially read a bar-code with a movement of a read range with respect to the bar-code to obtain multiple pieces of bar-code data; a storage section to store the pieces of bar-code data obtained by the reading section; a detection section to detect a moving state of the reading section in a three-dimensional space; a calculation section to calculate a moving distance of the reading section required for synthesis of the pieces of bar-code data based on the moving state detected by the detection section; a synthesis section to synthesize the pieces of bar-code data stored in the storage section to produce synthesized bar-code data by combining bar-code data obtained before the reading section moves the moving distance with bar-code data obtained after the reading section moves the moving distance; and a decode section to decode the synthesized bar-code data produced by the synthesis section.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 5 shows image data of a bar code to be read, a light irradiation line, and image data of the bar code recognized by a reading section in the irradiation state shown in FIG. 4;

FIG. 8 shows image data of a bar code to be read, a light irradiation line, and image data of the bar code recognized by the reading section in the irradiation state shown in FIG. 7;

FIG. 11 shows image data of a bar code to be read, a light irradiation line, and image data of the bar code recognized by the reading section in the irradiation state shown in FIG. 10;

FIG. 14 shows image data of a bar code to be read, a light irradiation line, and image data of the bar code recognized by the reading section in the irradiation state shown in FIG. 13;

FIG. 17 shows image data of a bar code to be read, a light irradiation line, and image data of the bar code recognized by the reading section in the irradiation state shown in FIG. 16;

DESCRIPTION OF THE PREFERRED EMBODIMENTS

Preferred embodiments of the present invention will be explained with reference to the drawings.

First Embodiment

Figure 1:
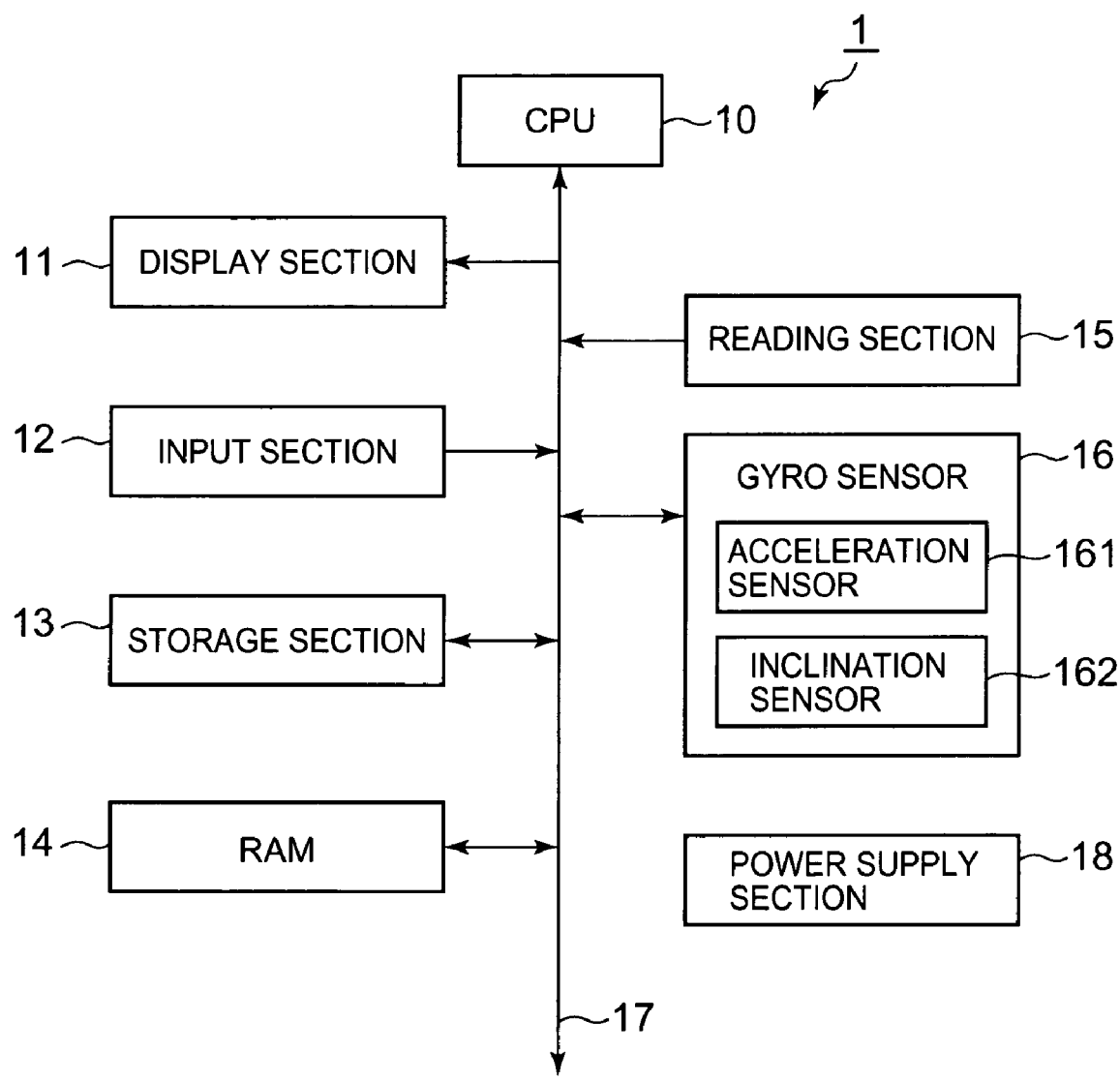
FIG. 1 is a block diagram showing a configuration of a main part of a bar-code reading apparatus according to preferred embodiments of the present invention.

A configuration in a first embodiment of the present invention will be described below. FIG. 1 shows a configuration of a main part of a bar-code reading apparatus 1 according to the first embodiment of the present invention. The bar-code reading apparatus 1 is a handheld reading apparatus in which a user holds a scanner part in her/his hand to read a bar code. As shown in FIG. 1, the bar-code reading apparatus 1 includes a CPU (Central Processing Unit) 10, a display section 11, an input section 12, a storage section 13, a RAM (Random Access Memory) 14, a reading section 15, and a gyro sensor 16. The respective sections are electrically connected through a bus 17 and receive a power supply from the power supply section 18.

The CPU 10 loads various control programs stored in the storage section 13 into the RAM 14 and executes various processes in cooperation with the control programs. More specifically, the CPU 10 executes a bar-code reading process according to the control programs stored in the storage section 13 (see FIG. 2). The CPU 10 of the first embodiment functions as a correction section, a synthesis section, and a decode section.

The display section 11 has a display such as an LCD (Liquid Crystal Display) and performs a necessary display process according to a display control signal inputted from the CPU 10.

The input section 12 includes various keys such as a trigger key to start a reading operation of a bar code and a touch panel arranged to cover a display screen of the display section 11, and outputs an operation signal obtained by a key operation or a touch panel operation to the CPU 10.

The storage section 13 stores the various control programs executed by the CPU 10 and data required when executing the control programs.

The RAM 14 includes a program storage region into which the various control programs executed by the CPU 10 are loaded, and a data storage region in which input data and data such as a process result generated when executing the control programs is temporarily stored.

The reading section 15 includes a CMOS (Complementary Metal Oxide Semiconductor) image sensor or a CCD (Charge Coupled Device) image sensor and an A/D converter, or the like. The reading section 15 reads a bar-code from reflected light of laser light irradiated on a bar-code, converts an optical image signal obtained by the reading into an electric signal (analog signal) by photoelectric conversion using the CMOS image sensor or the CCD image sensor, and converts the analog signal into a digital signal using the A/D converter to obtain image data of the bar-code. The bar-code data obtained by the reading section 15 is expressed as a counter value representing width of a white or black bar of the bar-code. For example, the bar-code data is expressed as follows: a white bar is 60 in width, a black bar is 10 in width, a white bar is 20 in width, . . . , in an alignment order of bars.

The gyro sensor 16 includes an acceleration sensor 161 and an inclination sensor 162 to detect a moving state of the reading section 15 in a three-dimensional space during a reading operation of a bar-code. The acceleration sensor 161 detects acceleration, moving time, and a moving direction of the reading section 15 moving in the three-dimensional space. A moving distance of the reading section 15 can be calculated by the information detected by the acceleration sensor 161. The inclination sensor 162 detects inclination of the reading section 15 caused by the movement of the reading section 15 in the three-dimensional space. An irradiation angle of light with respect to a bar-code surface can be calculated by the inclination detected by the inclination sensor 162. The gyro sensor 16 functions as a detection section.

An operation in the first embodiment of the present invention will be described below.

Figure 2:
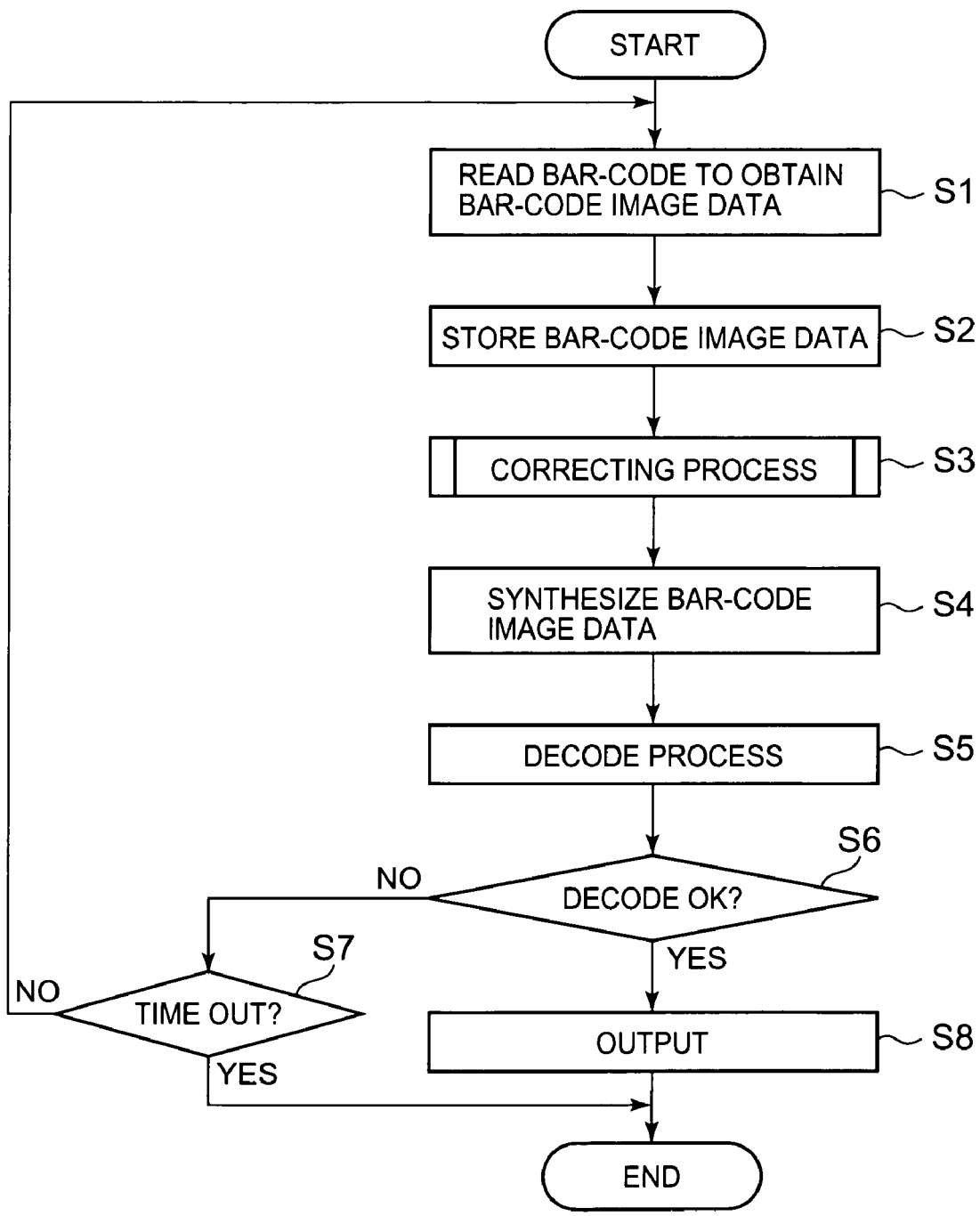
FIG. 2 is a flow chart showing a bar-code reading process executed under the control of a CPU of the bar-code reading apparatus according to a first embodiment of the present invention.

With reference to the flow chart in FIG. 2, a bar-code reading process executed under the control of the CPU 10 of the bar-code reading apparatus 1 according to the first embodiment will be described below.

When the trigger key of the input section 12 is depressed, reading of a bar-code is started by the reading section 15 at a predetermined scanning rate (for example, 100 scans/second), and a piece of image data of a bar-code (to be referred to as "bar-code image data" hereinafter) is obtained every time the reading is performed (step S1). As a result, multiple pieces of bar-code image data are obtained in the reading operations of step S1 and stored in the RAM 14 (step S2).

Next, a correcting process is carried out (step S3). In step S3, the pieces of bar-code image data stored in the RAM 14 in step S2 are corrected into pieces of bar-code image data which are obtained if the bar-code is read when the reading section 15 is at a preset reference position with respect to the bar-code. The correcting process in step S3 will be described later in detail with reference to FIGS. 3 to 20.

Next, the pieces of bar-code image data corrected in step S3 are synthesized to produce synthesized image data (step S4). In the synthesis in step S4, for example, a damaged part (worn part, a weak print part, or the like) of bars in one piece of bar-code image data is compensated with another piece of bar-code image data by combining the pieces of bar-code image data.

Next, a decode process of the bar-code is carried out by using the synthesized bar-code image data (step S5). In the decode process of step S5, an alignment of white and black bars expressed by the bar-code image data is converted into data expressing an alignment of numerical values and letters.

After the decode process is completed, it is determined whether the decoding can be properly carried out in the decode process in step S5 (step S6). If it is determined in step S6 that the decoding cannot be properly carried out (step S6; No), the control operation returns to step S1 unless time runs out (step S7; NO), and a bar-code reading operation is continuously carried out.

If it is determined in step S6 that the decoding can be properly carried out (step S6; YES), a processing result of the decode process is outputted (for example, displayed on the display section 11) (step S8), and the bar-code reading process is ended.

The correcting process of bar-code image data (step S3 in FIG. 2) will be described below in detail with reference to a flow chart in FIG. 3 and FIGS. 4 to 20.

The correcting process of bar-code image data in the embodiment is a process of correcting the pieces of bar-code image data actually obtained from the reading section 15 into pieces of bar-code image data which are obtained if the bar-code is read when the reading section 15 is at a preset reference position with respect to the bar-code, on the basis of a moving state of the reading section 15 in a three-dimensional space (x-y-z) which is obtained from the gyro sensor 16. In the following explanation, a center portion of the bar-code surface is set as an origin O in an orthogonal coordinate system, a direction perpendicular to the bar-code surface is an x-axis direction, and an alignment direction of bars on the bar-code surface is a y-axis direction.

In the embodiment, moving states of the reading section 15 in the three-dimensional space obtained from the gyro sensor 16 are classified into the following five types on the basis of an irradiation state from an optical source OS of the reading section 15, and correcting processes (correction H1 to correction H5) corresponding to the respective moving states will be described below.

Figure 4:
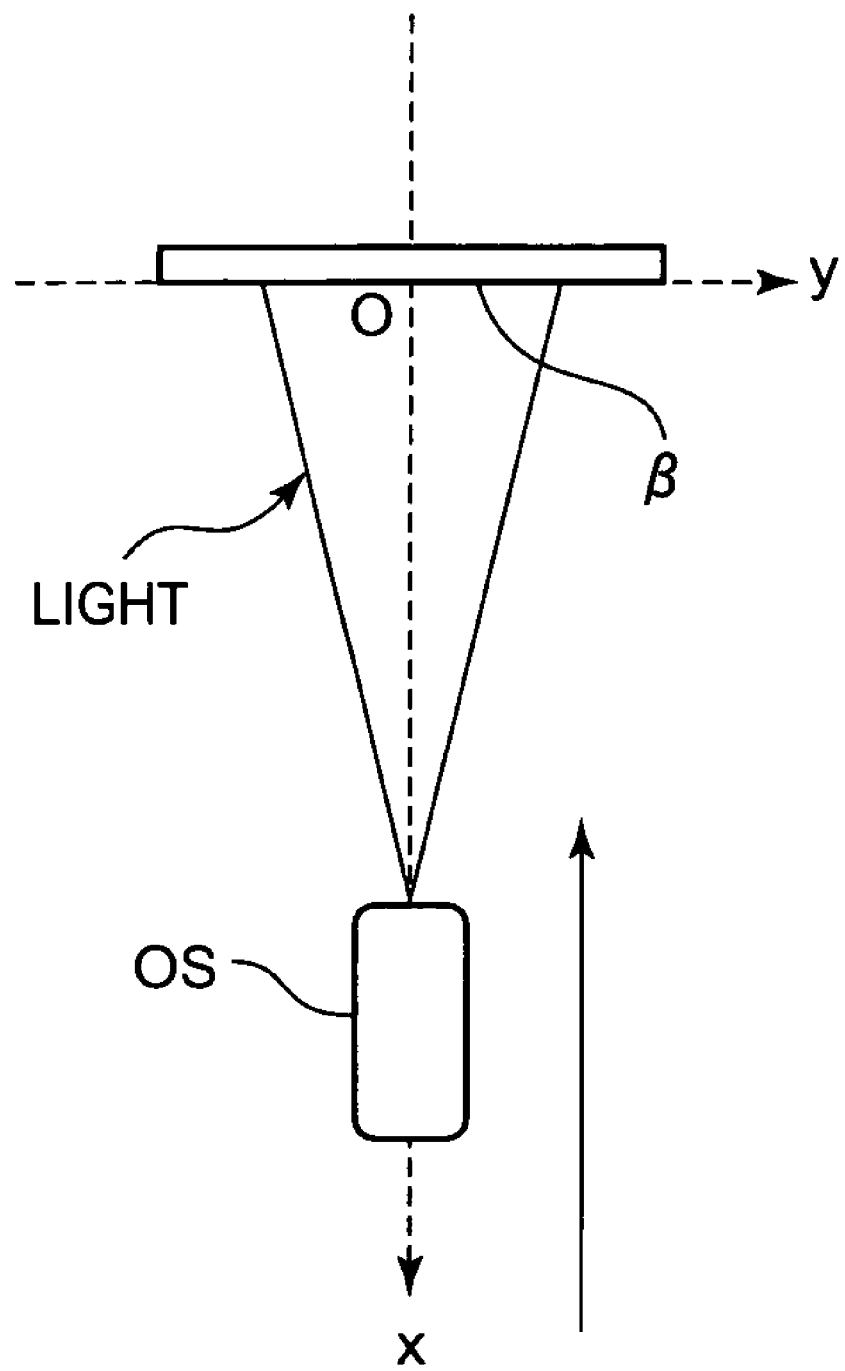
FIG. 4 is a pattern diagram showing a light irradiation state with respect to a bar-code surface, and more particularly a light irradiation state in which light is irradiated while moving closer to the bar-code surface.
Figure 7:
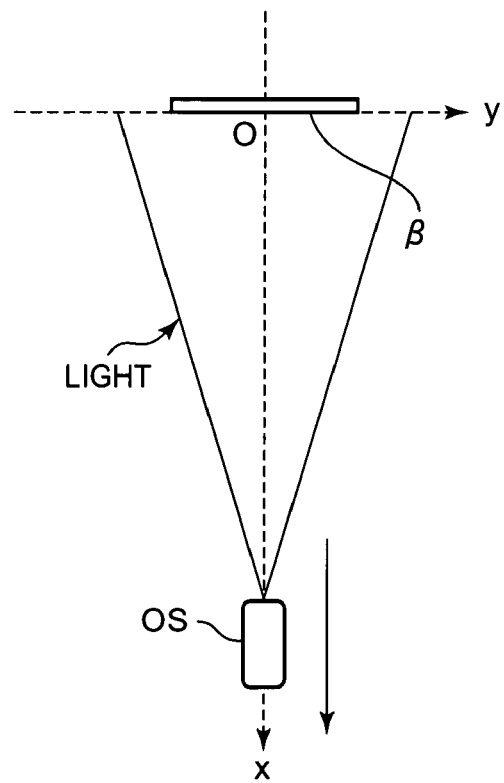
FIG. 7 is a pattern diagram showing a light irradiation state with respect to a bar-code surface, and more particularly a light irradiation state in which light is irradiated while moving away from the bar-code surface.
Figure 10:
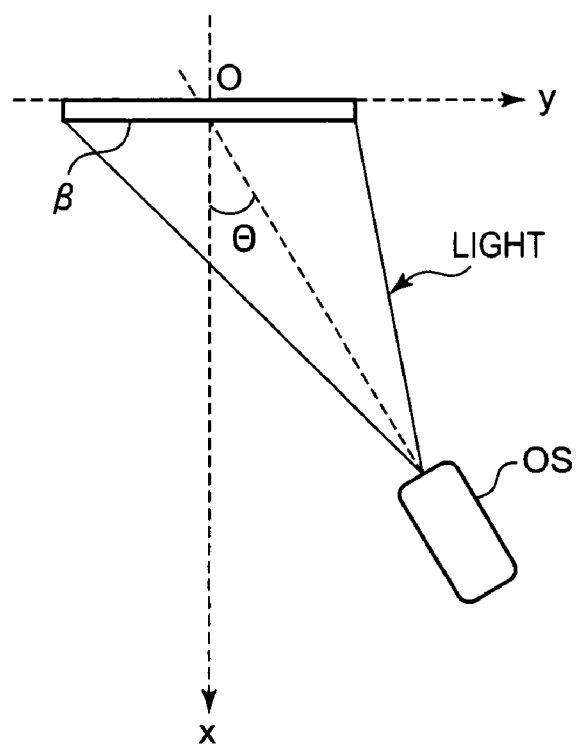
FIG. 10 is a pattern diagram showing a light irradiation state with respect to a bar-code surface, and more particularly a light irradiation state in which a light irradiation direction is inclined with respect to a reference direction (parallel to an x-axis direction) in an x-y plane.

[1] A state in which light is irradiated while moving closer to a bar-code surface β (see FIG. 4);

[2] a state in which light is irradiated while moving away from the bar-code surface β (see FIG. 7);

[3] a state in which a light irradiation direction is inclined with respect to a reference direction (parallel to an x-axis direction) in an x-y plane (see FIG. 10);

[4] a state in which light is irradiated while moving along an alignment direction of bars (y-axis direction) with respect to the bar-code surface β (see FIG. 13); and

Figure 16:
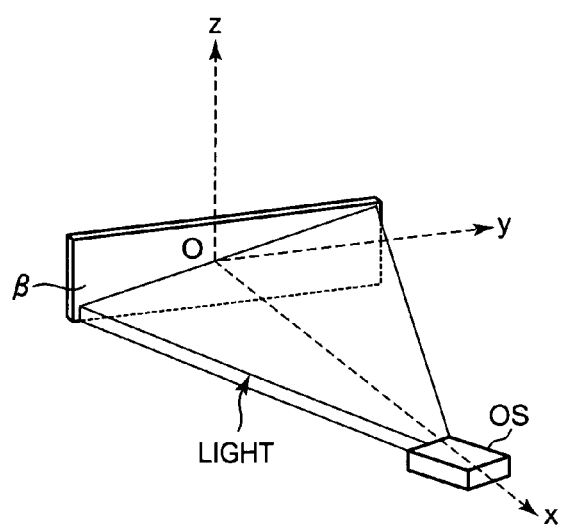
FIG. 16 is a pattern diagram showing a light irradiation state with respect to a bar-code surface, and more particularly a light irradiation state in which an irradiation line on the bar-code surface is inclined with respect to an alignment direction of bars (y-axis direction)

[5] a state in which an irradiation line on the bar-code surface β is inclined with respect to an alignment direction of bars (y-axis direction) (see FIG. 16).

The moving state actually detected by the gyro sensor 16 is a combination of moving states corresponding to the above states [1] to [5]. The combined moving state, however, is separated into the states [1] to [5], and correcting processes corresponding to the respective moving states are carried out. This can lead to a result corresponding to the combined moving state.

Figure 3:
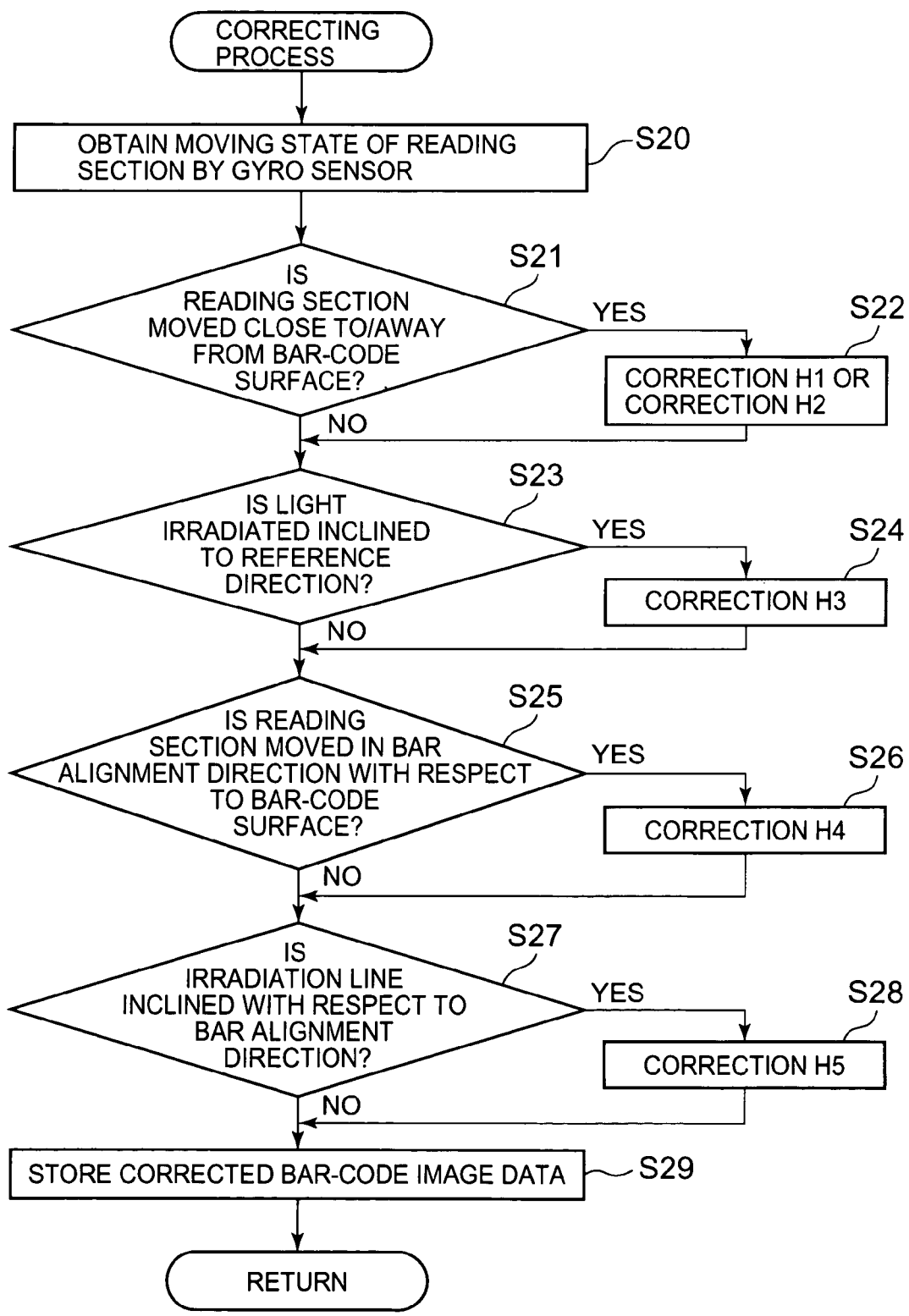
FIG. 3 is a flow chart showing details of a correcting process shown in FIG. 2.

In the correcting process of bar-code image data shown in FIG. 3, a moving state of the reading section 15 is obtained from the gyro sensor 16 (step S20). Then it is determined whether the moving state includes the state in which light is irradiated while moving closer to a bar-code surface β as shown in FIG. 4 (the moving state [1]) or the state in which light is irradiated while moving away from the bar-code surface β as shown in FIG. 7 (the moving state [2]) (step S21).

If it is determined in step S21 that the moving state obtained from the gyro sensor 16 includes the moving state [1] or the moving state [2] (step S21; YES), the following correction H1 or correction H2 is carried out (step S22).

[Correction H1]

In the moving state [1] shown in FIG. 4, as the optical source OS moves closer to the bar-code surface β, a width of an irradiation line L of light on the bar-code surface β becomes narrow as shown in the upper row of FIG. 5. Therefore, as shown in the lower row of FIG. 5, the width of each bar actually recognized by the reading section 15 is larger than the original width shown in the upper row of FIG. 5. In FIG. 5, "bar width" corresponding to white and black bars denotes a counter value representing a width of bar. For example, the bar width is expressed as follows: a white bar is 60 in width, a black bar is 10 in width, a white bar is 20 in width, . . . , in an alignment order of bars. This is also applied to the states shown in FIG. 8, FIG. 11, FIG. 14, and FIG. 17.

Figure 6:
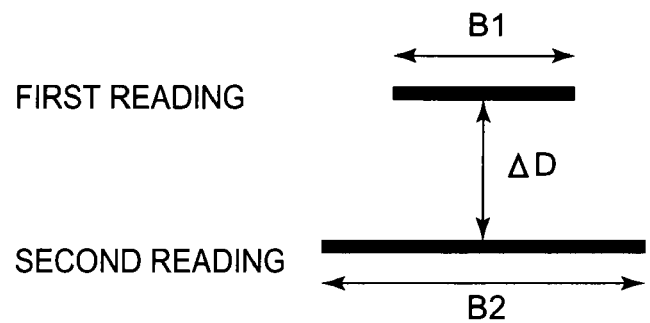
FIG. 6 is a diagram for explaining a correcting method of a bar width in the irradiation state shown in FIG. 4.

A bar width increase rate due to the moving distance of the optical source OS of the reading section 15 changes depending on characteristics of a scanner module used in the reading section 15 and is preset. For example, as shown in FIG. 6, given that a bar width obtained by a first reading operation, a bar width obtained by a second reading operation, a moving distance of the optical source OS obtained from the gyro sensor 16, and a bar width increase rate due to the moving distance are represented by B1, B2, ΔD, and a correction coefficient f1, respectively, a bar width obtained after the correction H1 is derived from Equation (1):

$$\text{(bar width obtained after correction)} = \text{(bar width obtained before correction)} \times \Delta D \times f1 \quad (1).$$

[Correction H2]

In the moving state [2] shown in FIG. 7, as the optical source OS moves away from the bar-code surface β, a light irradiation line L on the bar-code surface β becomes wide as shown in the upper row of FIG. 8. Therefore, as shown in the lower row of FIG. 8, the width of each bar actually recognized by the reading section 15 is smaller than the original width shown in the upper row of FIG. 8.

Figure 9:
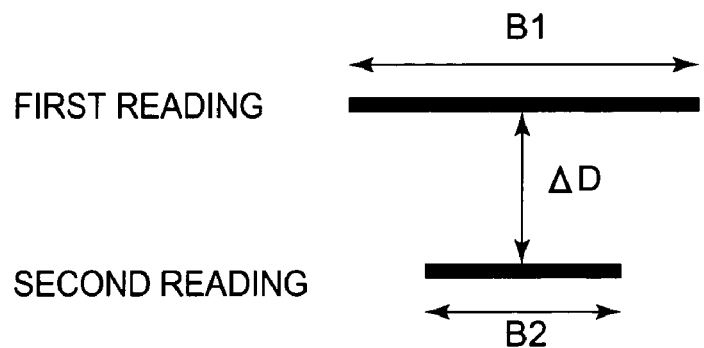
FIG. 9 is a diagram for explaining a correcting method of a bar width in the irradiation state shown in FIG. 7.

A bar width decrease rate due to the moving distance changes depending on characteristics of a scanner module used in the reading section 15 and is preset. For example, as shown in FIG. 9, given that a bar width obtained by a first reading operation, a bar width obtained by a second reading operation, a moving distance of the optical source OS obtained from the gyro sensor 16, and a bar width decrease rate due to the moving distance are represented by B1, B2, ΔD, and a correction coefficient f2, respectively, a bar width obtained after the correction H2 is derived from Equation (2):

$$\text{(bar width obtained after correction)} = \text{(bar width obtained before correction)} \times \Delta D \times f2 \quad (2).$$

If it is determined in step S21 in FIG. 3 that the moving state obtained from the gyro sensor 16 includes neither the moving state [1] nor the moving state [2] (step S21; NO), or if the correction H1 or the correction H2 in step S22 is finished, it is determined whether the moving state obtained from the gyro sensor 16, as shown in FIG. 10, includes a state in which a light irradiation direction is inclined with respect to a reference direction (parallel to an x-axis direction) in an x-y plane (the moving state [3]) (step S23).

If it is determined in step S23 that the moving state obtained from the gyro sensor 16 includes the moving state [3] (step S23; YES), the following correction H3 is carried out (step S24).

[Correction H3]

As shown in FIG. 10, when the light irradiation direction is inclined with respect to the x-axis, the irradiation line L on the bar-code surface β shown in the upper row of FIG. 11 has different distances from the optical source OS according to positions of bars (y-coordinate values). In the moving state [3] shown in FIG. 10, since the distance from the optical source OS decreases in the positive direction of the y-axis, the bar width becomes wide, whereas since the distance from the optical source OS increases in the negative direction of the y-axis, the bar width becomes thin as shown in the lower row of FIG. 11.

Figure 12:
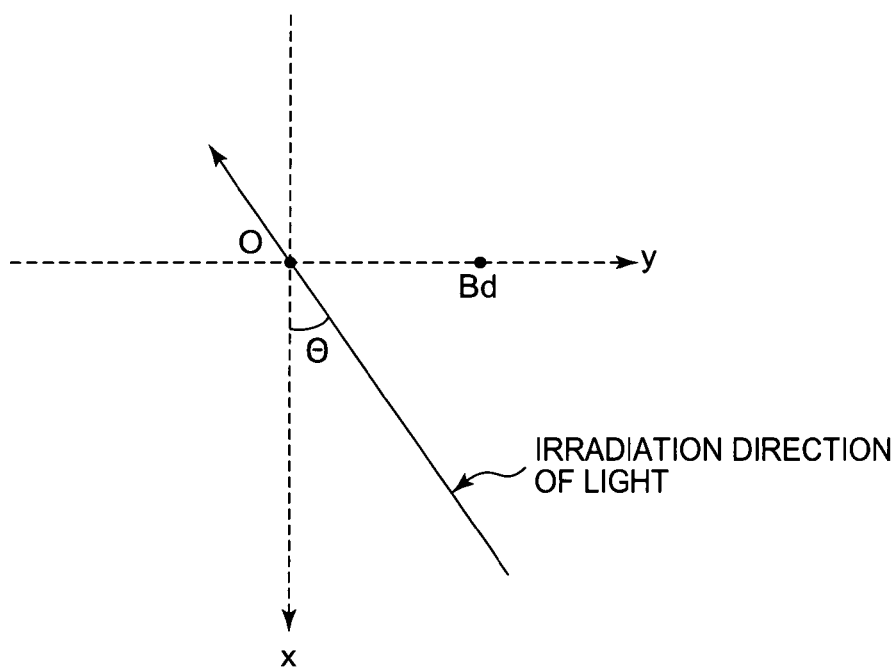
FIG. 12 is a diagram for explaining a correcting method of a bar width in the irradiation state shown in FIG. 10.

As shown in FIG. 12, when the light irradiation direction is inclined at an inclination angle Θ with respect to the x-axis, a rate of change of bar width due to a bar position (y=Bd) changes depending on characteristics of a scanner module used in the reading section 15 and is preset as a function of the bar position Bd and the inclination angle Θ obtained from the gyro sensor 16. Given that the rate of change of bar width is defined as a correction coefficient f (Bd, Θ), the bar width obtained after the correction H3 is derived from Equation (3):

$$\text{(bar width obtained after correction)} = \text{(bar width obtained before correction)} \times f(Bd, \Theta) \quad (3).$$

If it is determined in step S23 in FIG. 3 that the moving state obtained from the gyro sensor 16 does not include the moving state [3] (step S23; NO), or if the correction H3 in step S24 is finished, it is determined whether the moving state obtained from the gyro sensor 16, as shown in FIG. 13, includes a state in which light is irradiated while moving along an alignment direction of bars (y-axis direction) with respect to the bar-code surface β (the moving state [4]) (step S25).

If it is determined in step S25 that the moving state obtained from the gyro sensor 16 includes the moving state [4] (step S25; YES), the following correction H4 is carried out (step S26).

[Correction H4]

Figure 13:
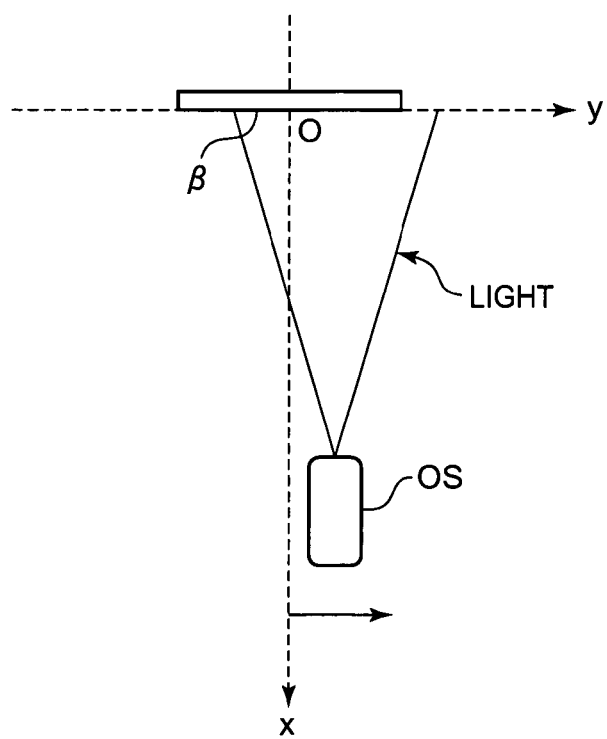
FIG. 13 is a pattern diagram showing a light irradiation state with respect to a bar-code surface, and more particularly a light irradiation state in which light is irradiated while moving along a y-axis direction with respect to the bar-code surface.

In the moving state [4] shown in FIG. 13, since the irradiation line L on the bar-code surface β shown in the upper row of FIG. 14 moves in an alignment direction of bars, a width of a start margin (or a width of an end margin) of a bar-code recognized by the reading section 15 changes as shown in the lower row of FIG. 14. Therefore, in the correction H4, with reference to bar-code image data obtained by a first reading operation, a width of the start margin of the bar-code image data obtained by a second reading operation is corrected on the basis of bar-code image data having characteristics of a start code or the like.

Figure 15:
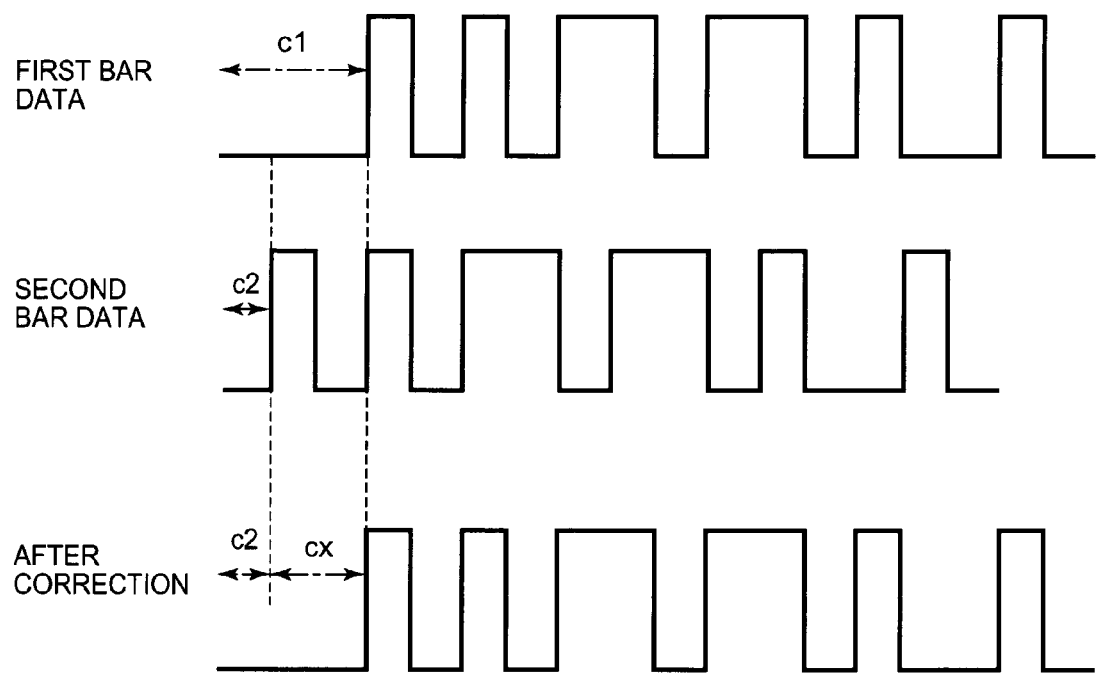
FIG. 15 is a diagram for explaining a correcting method of a start margin width in the irradiation state shown in FIG. 13.

As shown in FIG. 15, given that counter values up to the first black bar of the bar-code in the first reading operation and the second reading operation are represented by c1 and c2, respectively, the width of the start margin may be corrected by cx=c1−c2. More specifically, the width of the start margin obtained after the correction is derived from Equation (4):

$$\text{(width of start margin obtained after correction)} = \text{(width of start margin obtained before correction)} + cx \quad (4).$$

If it is determined in step S25 in FIG. 3 that the moving state obtained from the gyro sensor 16 does not include the moving state [4] (step S25; NO), or if the correction H4 in step S26 is finished, it is determined whether the moving state obtained from the gyro sensor 16, as shown in FIG. 16, includes a state (the moving state [5]) in which an irradiation line on the bar-code surface β is inclined with respect to an alignment direction of bars (y-axis direction) (step S27).

If it is determined in step S27 that the moving state obtained from the gyro sensor 16 includes the moving state [5] (step S27; YES), the following correction H5 is carried out (step S28).

[Correction H5]

In the moving state [5] shown in FIG. 16, since the irradiation line L on the bar-code surface β is inclined with respect to an alignment direction of bars (y-axis direction) as shown in the upper row of FIG. 17, as shown in the lower row of FIG. 17, the width of each bar is larger than the original width shown in the upper row of FIG. 17.

Figure 18:
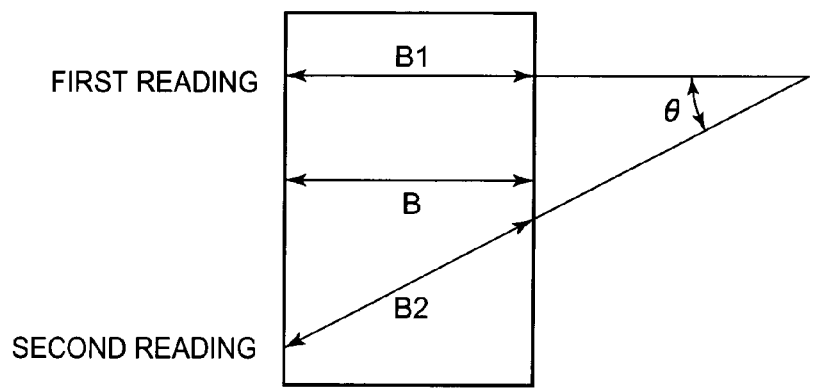
FIG. 18 is a diagram for explaining a correcting method of a bar width in the irradiation state shown in FIG. 16.

For example, as shown in FIG. 18, when the reading direction of the first reading operation is parallel to the alignment direction of bars (bar width B1), and when the reading direction of the second reading operation is inclined at an angle θ with respect to the alignment direction of bars, a bar width B obtained by correcting a bar width B2 obtained by the second reading operation is derived from Equation (5):

$$B = B2 \cdot \cos \theta \qquad (5).$$

Figure 19:
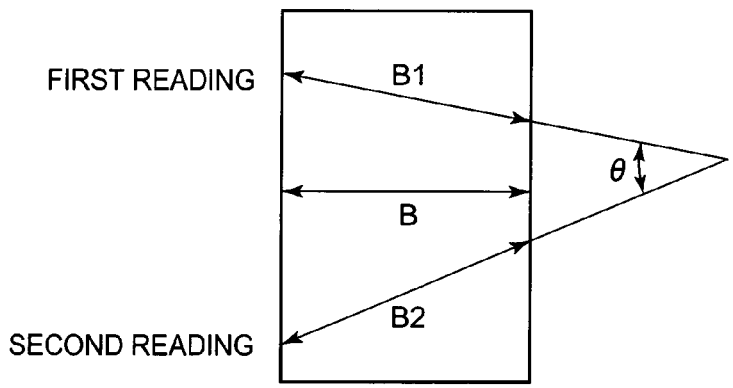
FIG. 19 is a diagram for explaining a correcting method of a bar width in the irradiation state shown in FIG. 16.
Figure 20:
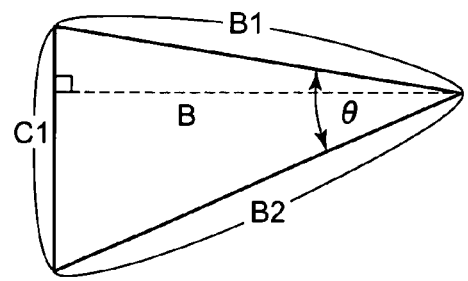
FIG. 20 is a diagram for explaining a correcting method of a bar width in the irradiation state shown in FIG. 16.

However, in the actual reading operations, since the first reading direction is not always in parallel to the alignment direction of bars as shown in FIG. 18, a correction value of bar width should be calculated in consideration of a case in which the first reading direction is inclined with respect to the alignment direction of bars as shown in FIG. 19. As shown in FIG. 19, a bar width obtained by the first reading operation is represented by B1, a bar width obtained by the second reading operation is represented by B2, and an inclination angle obtained from the gyro sensor 16 during the first and second reading operations is represented by θ. In this case, as shown in FIG. 20, in a triangle having two sides B1 and B2 and a contained angle θ between both the sides, a length B of a perpendicular line extending from the vertex corresponding to the angle θ to the opposite side (length: C) is a correction value of the bar width.

In the triangle shown in FIG. 20, the length C is derived from Equation (6).

$$C = \sqrt{B1^2 + B2^2 - 2B1 \cdot B2 \cdot \cos \theta} \qquad (6)$$

Since an area of the triangle is given by $(\tfrac{1}{2}) B \cdot C = (\tfrac{1}{2}) B1 \cdot B2 \cdot \sin \theta$, the bar width B obtained after the correction is derived from Equation (7).

$$B = \frac{B1 \cdot B2 \cdot \sin \theta}{C} = \frac{B1 \cdot B2 \cdot \sin \theta}{\sqrt{B1^2 + B2^2 - 2B1 \cdot B2 \cdot \cos \theta}} \qquad (7)$$

In step S27 in FIG. 3, if it is determined that a moving state obtained from the gyro sensor 16 does not include the moving state [5] (step S27; NO), or if the correction H5 in step S28 is finished, the corrected bar-code image data is stored in the RAM 14 (step S29), and the correcting process is ended.

Figure 24:
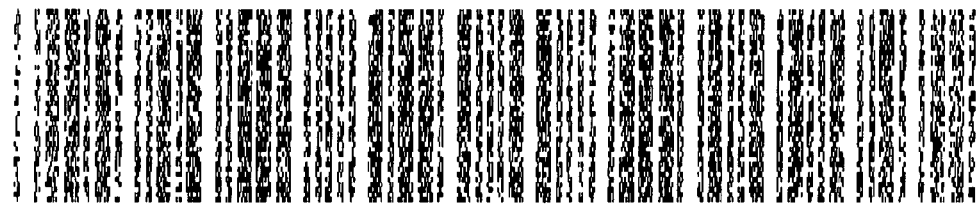
FIG. 24 is a diagram showing an example of a defective bar-code.
Figure 25:
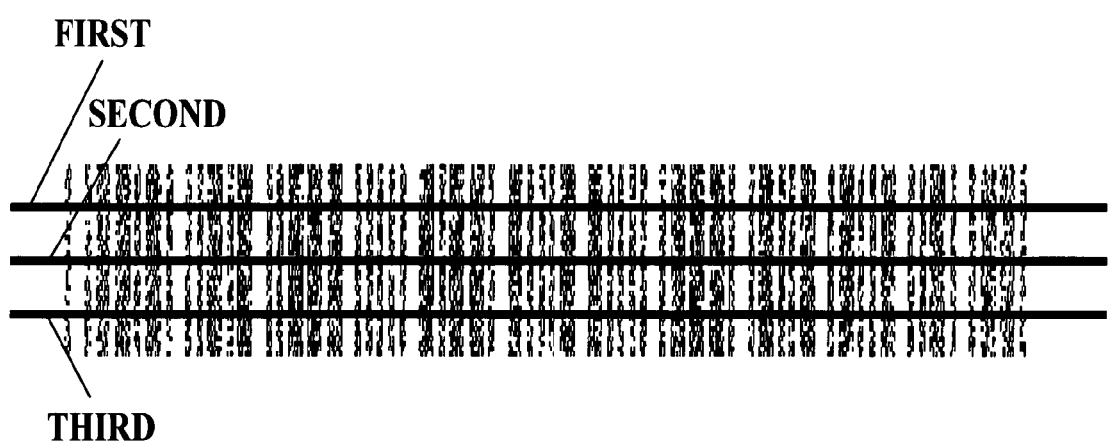
FIG. 25 is a diagram showing a plurality of irradiation lines having different light irradiation positions on a bar-code surface shown in FIG. 24.

As described above, according to the bar-code reading apparatus 1 of the first embodiment of the present invention, it is possible to accurately carry out a synthesis process of even a defective bar-code as shown in FIG. 24 by correcting the pieces of bar-code image data obtained from the reading section 15 into pieces of bar-code image data which are obtained if the bar-code is read when the reading section 15 is at a preset reference position with respect to the bar-code, based on the moving state obtained from the gyro sensor 16. In this manner, an accurate reading result can be obtained.

Second Embodiment

A second embodiment of the present invention will be described below with reference to FIGS. 21 to 23.

In the second embodiment of the present invention, it is assumed that an entire width of a bar-code to be read is larger than a read range at one reading operation by the bar-code reading apparatus 1 and that the read range continuously moves in the alignment direction of bars to read the entire bar-code.

Since a configuration of the bar-code reading apparatus according to the second embodiment is the same as the configuration of the bar-code reading apparatus 1 shown in FIG. 1 in the first embodiment, functions different from those in the first embodiment will be described below.

A CPU 10 of the second embodiment loads various control programs stored in the storage section 13 into a RAM 14 and executes various processes in cooperation with the control programs. More specifically, the CPU 10 executes a bar-code reading process according to the control programs stored in the storage section 13 (see FIG. 21). The CPU 10 of the second embodiment functions as a calculation section, a synthesis section, a decode section, and a correction section.

An operation in the second embodiment of the present invention will be described below.

A bar-code reading process executed under the control of the CPU 10 of the bar-code reading apparatus 1 according to the second embodiment of the present invention will be described below with reference to the flow chart in FIG. 21. In the following description, bar-code data obtained by the reading section 15 is called "bar data".

When the trigger key of the input section 12 is depressed, reading of a bar-code is started by the reading section 15 at a predetermined scanning rate (for example, 100 scans/second) (step Q1). Before the time runs out after the trigger key is depressed (step Q2; NO), bar data is obtained by reading the bar-code and stored in the RAM 14 (step Q3).

Next, a decode process is carried out with respect to the bar data obtained in step Q3 (step Q4). In the decode process in step Q4, an alignment of white and black bars expressed by the bar data is converted into data expressing an alignment of numerical values or letters.

After the decode process is ended, it is determined whether the decoding can be correctly carried out in the decode process in step Q4 (step Q5). If it is determined in step Q5 that the decoding is correctly carried out (step Q5; YES), a synthesis process of the bar data is set to be "invalid" (step Q9), and the bar-code reading process is ended.

If it is determined in step Q5 that the decoding cannot be correctly carried out (step Q5; NO), a correcting process of the bar data obtained in step Q3 is carried out (step Q6). Subsequently, a synthesis process of the corrected bar data is carried out (step Q7). Here, the correcting process of the bar data is carried out before the synthesis process of the bar data because actually obtained bar data is probably different from bar data which is obtained if the bar-code is read when the reading section 15 is at a preset reference position with respect to the bar-code due to blurring or the like of a user.

Since the correcting process in step Q6 is the same as that shown in FIGS. 3 to 20 in the first embodiment, a description thereof will be omitted. The synthesis process in step Q7 will be described later in detail with reference to FIGS. 22 and 23.

In the synthesis process in step Q7, the decode process is carried out again after the bar data is synthesized. After the step Q7 is ended, it is determined whether the synthesized bar data can be correctly decoded (step Q8).

In step Q8, it is determined that the synthesized bar data cannot be correctly decoded (step Q8; NO), the control operation returns to step Q2 to repeat the processes subsequent to step Q3 until the time runs out.

If it is determined in step Q8 that the synthesized bar data can be correctly decoded (step Q8; YES), the subsequent synthesis process of the bar data is set to be "invalid" (step Q9), and the bar-code reading process is ended.

A synthesis process (step Q7 in FIG. 21) of bar data will be described below with reference to the flow chart in FIG. 22 and FIG. 23. In FIG. 22, the synthesis process of bar data after the above-described correcting process (i.e., the bar data is obtained if the bar-code is read when the reading section 15 is at a preset reference position with respect to the bar-code) will be described below.

It is determined whether the synthesis process of the bar data is set to be "valid" (step Q11). When the reading of the bar code is started, it is assumed that the synthesis process of the bar code is set to be "invalid".

When the synthesis process of the bar data is not set to be "valid" in step Q11, i.e., if it is determined that the synthesis process is set to be "valid" (step Q11; NO), a start code or a stop code is detected from the bar data obtained in the first reading operation (step Q12), and it is determined whether the start code or the stop code is detected (step Q13).

In step Q13, it is determined whether the start code or the stop code cannot be detected (step Q13; NO), the synthesis process is ended. On the other hand, in step Q13, if it is determined that the start code or the stop code can be detected (step Q13; YES), the synthesis process of the bar data is set to be "valid" (step Q14).

A moving distance for synthesis expressing a moving distance required for the next synthesis is set at 0 (step Q15) and present position information is reset in the gyro sensor 16 (step Q16). Furthermore, the bar data obtained in the first reading operation is stored in the RAM 14 (step Q17), and the control operation returns to step Q8 in FIG. 21.

It is determined in step Q11 that the synthesis process of the bar code is set to be "valid" (step Q11; YES), it is determined whether the moving distance for synthesis is set at 0 (step Q18). If it is determined in step Q18 that the moving distance for synthesis is set at 0 (step Q18; YES), a start code or a stop code is detected from bar data obtained in the second reading operation (step Q19).

It is determined whether a pattern of the start code or the stop code detected in step Q19 is matched with a pattern of the start code or the stop code detected in the first reading operation (step Q20).

It is determined in step Q20 that both the patterns are not matched with each other (step Q20; NO), the control operation shifts to step Q24 to clear the previously (first) obtained bar data from the RAM 14 (step Q24) and to store the currently (second) obtained bar data in the RAM 14 (step Q25). The control operation returns to step Q8 in FIG. 21.

On the other hand, it is determined in step Q20 that both the patterns are matched with each other (step Q20; YES), a moving distance detected by the gyro sensor 16 is obtained (step Q21), and a moving distance of one counter value (a moving distance per counter) is calculated based on the obtained moving distance (step Q22).

Figure 23:
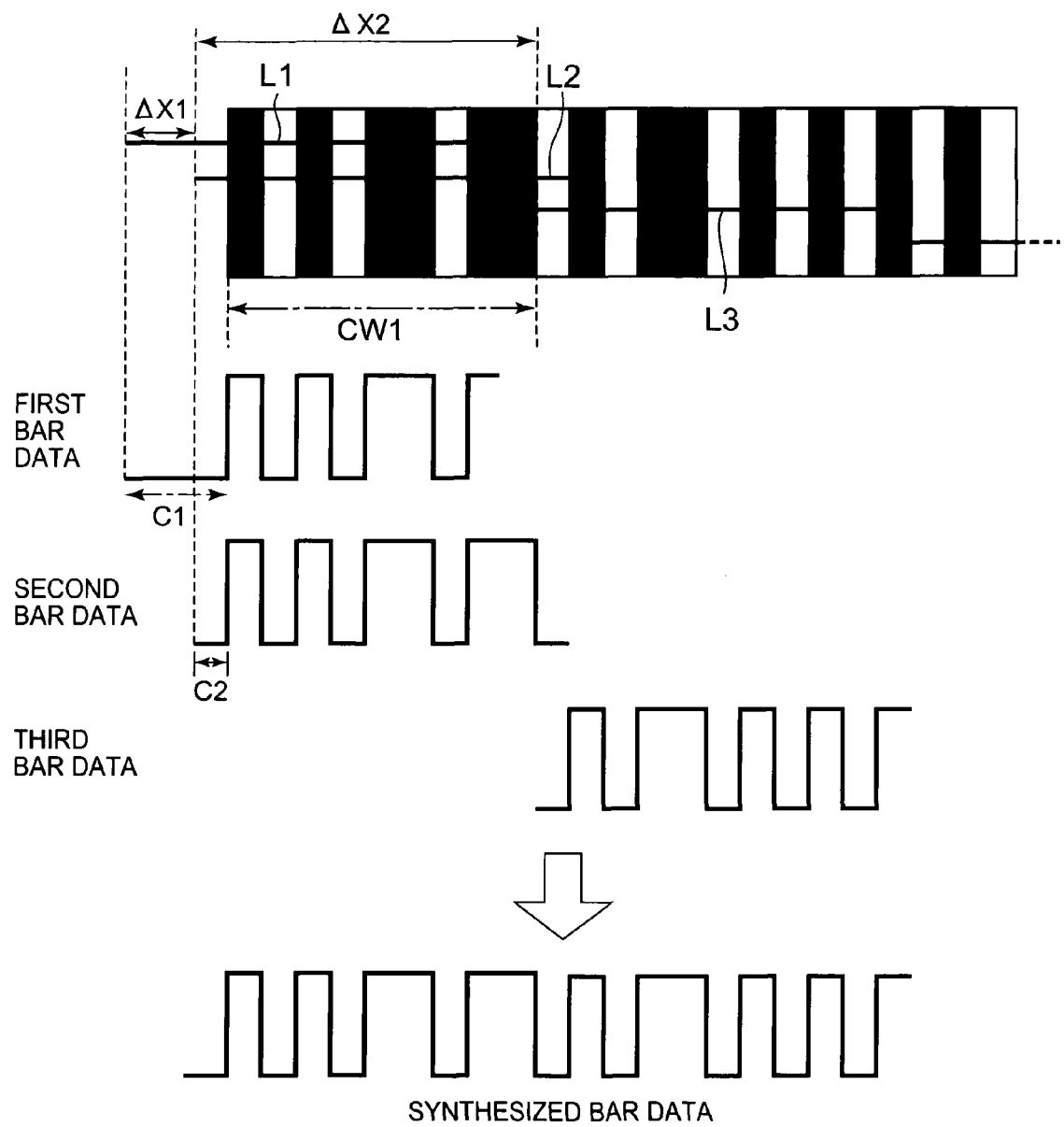
FIG. 23 is a diagram for explaining a synthesis method of bar data.

As shown in FIG. 23, irradiation lines (read ranges) of light on a bar-code surface in the first and second reading operations are represented by L1 and L2, respectively. At this time, given that counter values up to the first black bar of the bar code obtained in the first and second reading operations are represented by C1 and C2, respectively, and a moving distance detected by the gyro sensor 16 during the first and second reading operations is represented by ΔX1. In this case, a moving distance of one counter value ΔX is derived from Equation (8):

$$\Delta X = \Delta X1/(C1-C2) \quad (8).$$

After the moving distance of one counter value is calculated, a moving distance for synthesis, which is a moving distance required until the next synthesis, is calculated from the moving distance of one counter value and a total of the counter values of bar data obtained in the current reading operation (step Q23). In FIG. 23, given that a total of counter values of bar data obtained in the second reading operation is represented by CW1, a moving distance for synthesis ΔX2 is derived from Equation (9) using the moving distance of one counter value ΔX.

$$\Delta X2 = CW1 \times \Delta X \quad (9)$$

Figure 21:
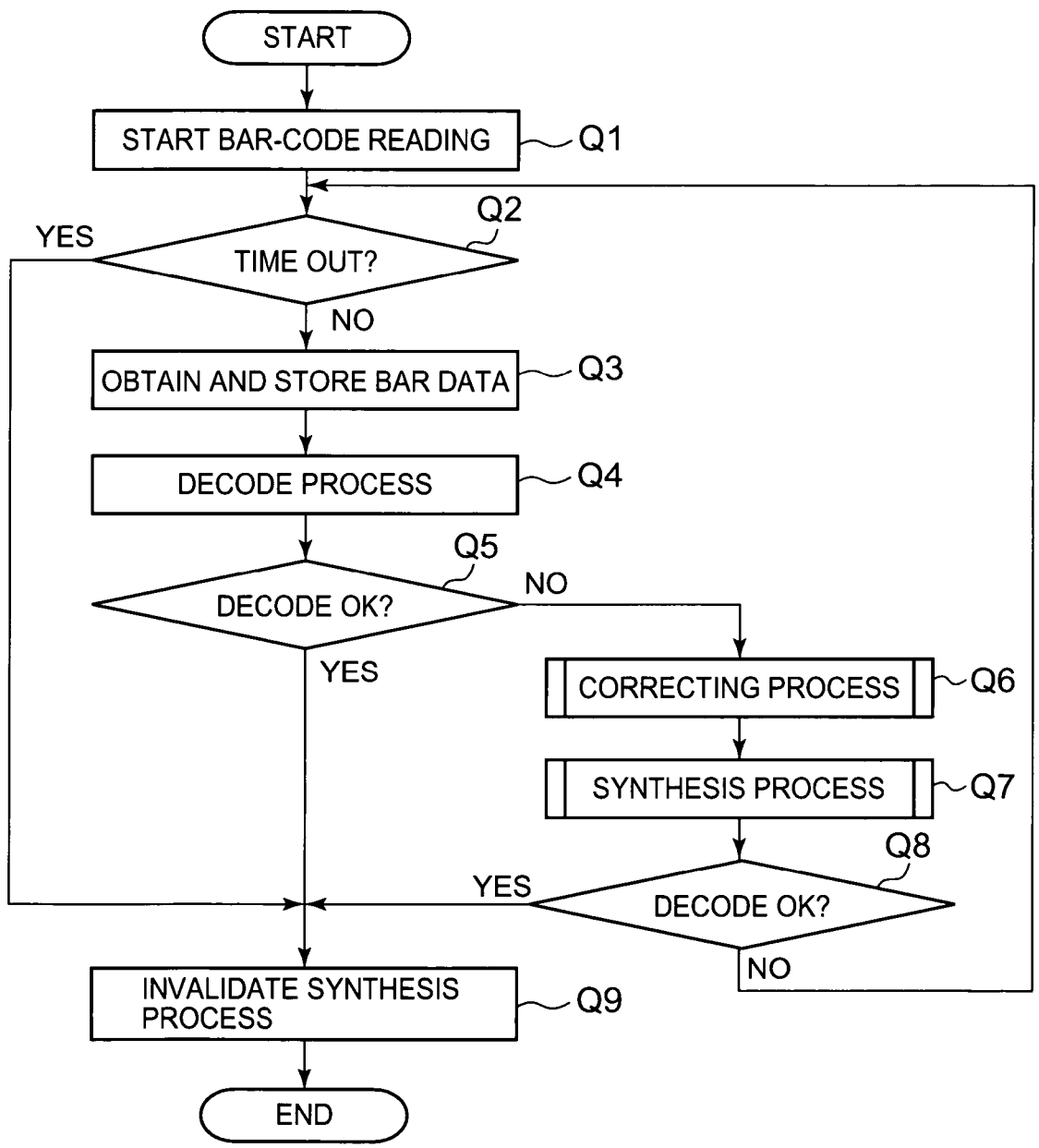
FIG. 21 is a flow chart showing a bar-code reading process executed under the control of a CPU of a bar-code reading apparatus according to a second embodiment of the present invention.
Figure 22:
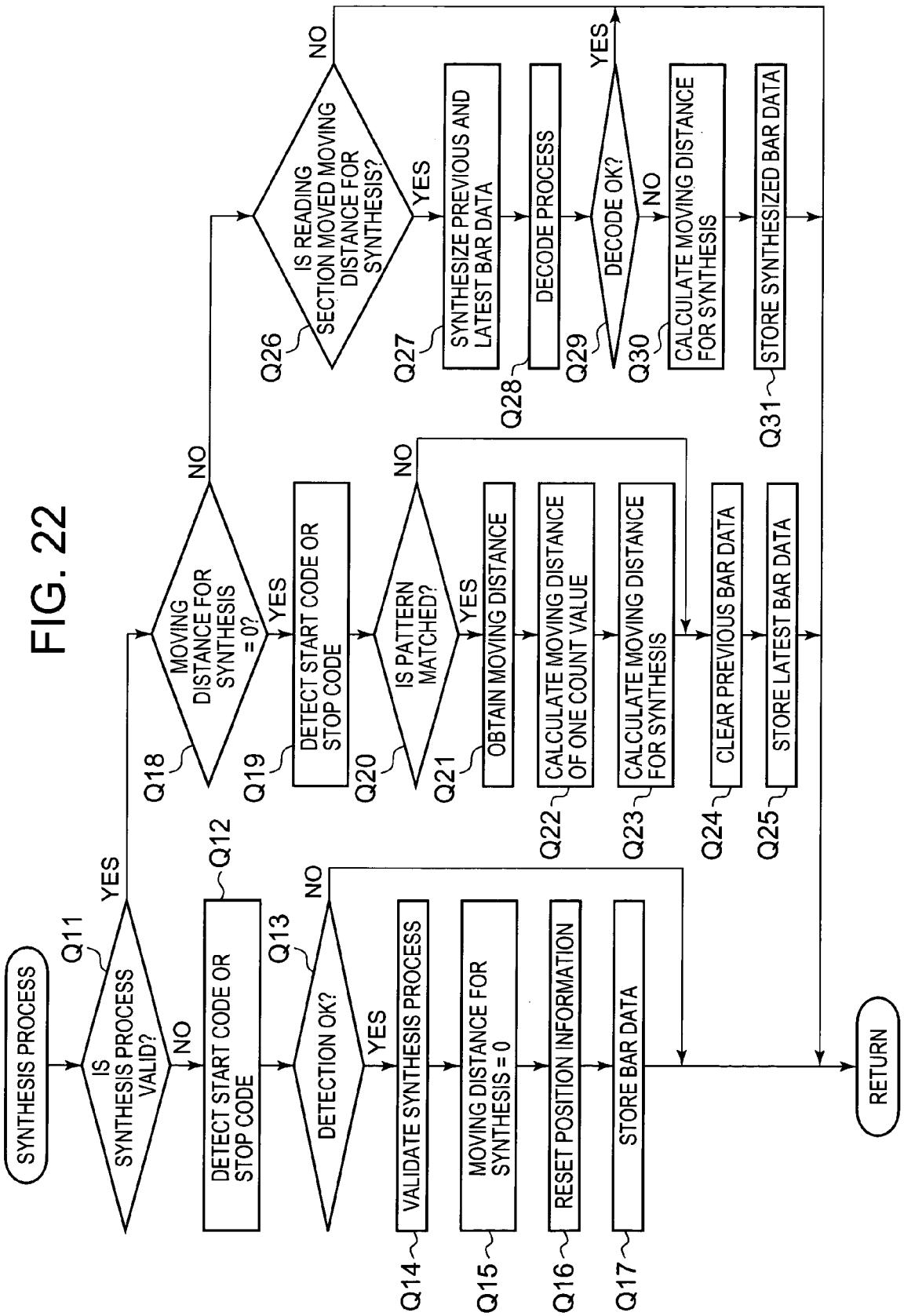
FIG. 22 is a flow chart showing details of a synthesis process shown in FIG. 21.

After the moving distance for synthesis is calculated, the bar data obtained in the previous (first) reading operation is cleared from the RAM 14 (step Q24), the bar data obtained in the current (second) reading operation is stored in the RAM 14 (step Q25), and the control operation returns to step Q8 in FIG. 21.

If it is determined in step Q18 that the moving distance for synthesis is not 0 (step Q18; NO), and when the gyro sensor 16 detects that the reading section 15 moves the moving distance for synthesis (step Q26; YES), the previously obtained bar data (i.e., bar data obtained until immediately before the reading section 15 moves the moving distance for synthesis) and the currently obtained bar data (i.e., bar data obtained immediately after the reading section 15 moves the moving distance for synthesis) are synthesized with each other (step Q27).

In step Q27, as shown in FIG. 23, the bar data (bar data obtained immediately before the reading section 15 moves the moving distance for synthesis ΔX2) obtained in the second reading operation and bar data obtained in an irradiation line L3 immediately after the reading section 15 moves the moving distance for synthesis ΔX2 after the second reading operation are coupled with each other. In FIG. 23, the first, second, and third . . . represent the minimal number of reading for synthesis of the bar data, but do not represent the number of actual reading carried out by the reading section 15 at a predetermined scanning rate.

After the synthesis in step Q27, a decode process is carried out to the synthesized bar data (step Q28). Upon completion of the decode process, it is determined whether decoding can be correctly carried out in the decode process in step Q28 (step Q29). If it is determined in step Q29 that the decoding can be correctly carried out (step Q29; YES), the synthesis process is ended, and the control operation returns to step Q8 in FIG. 21.

If it is determined in step Q29 that the decoding cannot be correctly carried out (step Q29; NO), as in Equation (9), a total of count values of the bar data obtained in the current reading operation is multiplied by the moving distance of one counter value ΔX calculated in step Q22 to obtain a moving distance for synthesis which is a moving distance required for the next synthesis (step Q30). After the step Q30, the synthesized bar data obtained in step Q27 is stored in the RAM 14 (step Q31), and then the control operation returns to step Q8 in FIG. 21.

As described above, according to the bar-code reading apparatus 1 of the second embodiment of the present invention, when a wide bar code is read, a moving distance required for synthesis of bar data (a moving distance for synthesis) is calculated by using the moving distance of one counter ΔX calculated based on the moving distance ΔX1 which is obtained from the gyro sensor 16 at the beginning, and the bar data obtained before the reading section 15 moves the moving distance for synthesis is synthesized with the bar data obtained after the reading section 15 moves the moving distance for synthesis. For this reason, overlapping parts of the synthesized regions are considerably removed, and the number of the synthesis processes is considerably reduced. Therefore, it is possible to enhance efficiency of the synthesis process of bar data (i.e., to optimize the synthesis process of bar data) and to increase a processing speed of the decode process.

Because the pieces of bar data actually obtained from the reading section 15 are corrected into pieces of bar data which are obtained if the bar-code is read when the reading section 15 is at a preset reference position with respect to the bar-code on the basis of the moving state obtained from the gyro sensor 16, it is possible to carry out the synthesis process more accurately.

The description in the first and second embodiments may be arbitrarily changed without departing from the spirit of the invention.

For example, in the correcting process of the first and second embodiments, the optical source OS substantially moves in an x-y plane with respect to the bar-code surface β. If the correcting process is carried out in view of moving states including movement in a z-axis direction as well as the moving states [1] to [5], the synthesis process can be carried out more accurately.

In the above-described second embodiment, the moving distance for synthesis is a value corresponding to a total of bar width obtained in one reading operation carried out by the reading section 15 (total of counter values). The moving distance for synthesis may be set to a distance corresponding to arbitrary width.

In the first and second embodiments, a moving state of the reading section 15 is detected by the gyro sensor 16. Another sensor may be used if it can detect a moving state in a three-dimensional space.

According to a first aspect of the preferred embodiments of the present invention, there is provided a bar-code reading apparatus comprising: a reading section to read a bar-code a plurality of times to obtain multiple pieces of bar-code image data; a storage section to store the pieces of bar-code image data obtained by the reading section; a detection section to detect a moving state of the reading section in a three-dimensional space during a reading operation of the bar-code; a correction section to correct the pieces of bar-code image data stored in the storage section into pieces of bar-code image data which are obtained if the bar-code is read when the reading section is at a preset reference position with respect to the bar-code, based on the moving state detected by the detection section; a synthesis section to synthesize the pieces of bar-code image data corrected by the correction section to produce synthesized image data; and a decode section to decode the synthesized image data produced by the synthesis section.

According to the bar-code reading apparatus, before synthesizing the pieces of image data of a bar-code, the pieces of image data are corrected into pieces of image data which are obtained if the bar-code is read when the reading section is at a reference position with respect to the bar-code. This makes it possible to carry out a synthesis process accurately. Therefore, an accurate reading result can be obtained.

Preferably, the detection section detects the moving state by using a gyro sensor, and the gyro sensor includes an acceleration sensor which detects acceleration of the reading section in the three-dimensional space and an inclination sensor which detects inclination of the reading section caused by moving of the reading section in the three-dimensional space.

According to a second aspect of the preferred embodiments of the present invention, there is provided a computer-readable medium embodying a program causing a computer to function as:

a reading section to read a bar-code a plurality of times to obtain multiple pieces of bar-code image data; a storage section to store the pieces of bar-code image data obtained by the reading section; a detection section to detect a moving state of the reading section in a three-dimensional space during a reading operation of the bar-code; a correction section to correct the pieces of bar-code image data stored in the storage section into pieces of bar-code image data which are obtained if the bar-code is read when the reading section is at a preset reference position with respect to the bar-code, based on the moving state detected by the detection section; a synthesis section to synthesize the pieces of bar-code image data corrected by the correction section to produce synthesized image data; and a decode section to decode the synthesized image data produced by the synthesis section.

According to a third aspect of the preferred embodiments of the present invention, there is provided a bar-code reading apparatus comprising: a reading section to sequentially read a bar-code with a movement of a read range with respect to the bar-code to obtain multiple pieces of bar-code data; a storage section to store the pieces of bar-code data obtained by the reading section; a detection section to detect a moving state of the reading section in a three-dimensional space; a calculation section to calculate a moving distance of the reading section required for synthesis of the pieces of bar-code data based on the moving state detected by the detection section; a synthesis section to synthesize the pieces of bar-code data stored in the storage section to produce synthesized bar-code data by combining bar-code data obtained before the reading section moves the moving distance with bar-code data obtained after the reading section moves the moving distance; and a decode section to decode the synthesized bar-code data produced by the synthesis section.

According to the bar-code reading apparatus, because a synthesis process of bar-code data is carried out on the basis of a moving state of the reading section, it is possible to considerably reduce the number of the synthesis process, and thereby to enhance efficiency of the synthesis process of bar-code data.

Preferably, the bar-code reading apparatus further comprises a correction section to correct the pieces of bar-code data obtained by the reading section into pieces of bar-code data which are obtained if the bar-code is read when the reading section is at a preset reference position with respect to the bar-code, based on the moving state detected by the detection section, wherein the synthesis section synthesizes the pieces of bar-code data corrected by the correction section.

Preferably, the detection section detects the moving state by using a gyro sensor, and the gyro sensor includes an acceleration sensor which detects acceleration of the reading section in the three-dimensional space and an inclination sensor which detects inclination of the reading section caused by moving of the reading section in the three-dimensional space.

According to a fourth aspect of the preferred embodiments of the present invention, there is provided a computer-readable medium embodying a program causing a computer to function as:

a reading section to sequentially read a bar-code with a movement of a read range with respect to the bar-code to obtain multiple pieces of bar-code data; a storage section to store the pieces of bar-code data obtained by the reading section; a detection section to detect a moving state of the reading section in a three-dimensional space; a calculation section to calculate a moving distance of the reading section required for synthesis of the pieces of bar-code data based on the moving state detected by the detection section; a synthesis section to synthesize the pieces of bar-code data stored in the storage section to produce synthesized bar-code data by combining bar-code data obtained before the reading section moves the moving distance with bar-code data obtained after the reading section moves the moving distance; and a decode section to decode the synthesized bar-code data produced by the synthesis section.

The entire disclosure of Japanese Patent Application No. 2007-082515 filed on Mar. 27, 2007 and Japanese Patent Application No. 2007-082520 filed on Mar. 27, 2007 including description, claims, drawings, and abstract are incorporated herein by reference in their entireties.

Although various exemplary embodiments have been shown and described, the invention is not limited to the embodiments shown. Therefore, the scope of the invention is intended to be limited solely by the scope of the claims that follow.

What is claimed is:

1. A bar-code reading apparatus comprising:
    a reading section configured to read a bar-code a plurality of times to obtain multiple pieces of bar-code image data;
    a storage section configured to store the pieces of bar-code image data obtained by the reading section;
    a detection section configured to detect a moving state of the reading section in a three-dimensional space when the reading section moves with respect to a bar-code surface during a reading operation of the bar-code;
    a correction section configured to correct the pieces of bar-code image data stored in the storage section into pieces of bar-code image data which would have been obtained if the bar-code were read when the reading section was at a preset reference position with respect to the bar-code, based on the moving state detected by the detection section;
    a synthesis section configured to synthesize the pieces of bar-code image data corrected by the correction section to produce synthesized image data; and
    a decode section configured to decode the synthesized image data produced by the synthesis section.

2. The bar-code reading apparatus according to claim 1, wherein the detection section detects one of (i) a moving state of the reading section in which the reading section moves from the reference position so as to move closer to the bar-code surface, and (ii) a moving state of the reading section in which the reading section moves from the reference position so as to move away from the bar-code surface, and
    wherein the correction section corrects the pieces of bar-code image data so that a bar width decreases based on a moving distance of the reading section when the reading section moves closer to the bar-code surface, and the correction section corrects the pieces of bar-code image data so that a bar width increases based on a moving distance of the reading section when the reading section moves away from the bar-code surface.

3. The bar-code reading apparatus according to claim 1, wherein the detection section detects a moving state of the reading section in which the reading section irradiates the bar-code surface with light in a light irradiation direction inclined with respect to a reference direction of the reference position, and
    wherein the correction section corrects a bar width of the pieces of bar-code image data based on an inclination angle of the light irradiated from the reading section, in a case in which the reading section irradiates the bar-code surface with the light in the light irradiation direction inclined with respect to a reference direction of the reference position.

4. The bar-code reading apparatus according to claim 1, wherein the detection section detects a moving state of the reading section in which the reading section moves from the reference position along an alignment direction of bars of the bar-code with respect to the bar-code surface, and
    wherein the correction section corrects a width of a start margin of the pieces of bar-code image data in a case in which the reading section moves from the reference position along the alignment direction of the bars of the bar-code with respect to the bar-code surface.

5. The bar-code reading apparatus according to claim 1, wherein the detection section detects a moving state of the reading section in which the reading section irradiates the bar-code surface with light which has an irradiation line on the bar-code surface that is inclined with respect to an alignment direction of bars of the bar-code, and
    wherein the correction section corrects a bar width of the pieces of bar-code image data based on an inclination angle of the irradiation line with respect to the alignment direction, in a case in which the reading section irradiates the bar-code surface with the light having the irradiation line on the bar-code surface that is inclined with respect to the alignment direction of the bars of the bar-code.

6. A non-transitory computer-readable medium having a program stored thereon that is executable by a bar-code reading apparatus which comprises a reading section to read a bar-code a plurality of times to obtain multiple pieces of bar-code image data, wherein the program controls the bar-code reading apparatus to function as:
    a reading section configured to read a bar-code a plurality of times to obtain multiple pieces of bar-code image data;
    a storage section configured to store the pieces of bar-code image data obtained by the reading section;
    a detection section configured to detect a moving state of the reading section in a three-dimensional space when the reading section moves with respect to a bar-code surface during a reading operation of the bar-code;
    a correction section configured to correct the pieces of bar-code image data stored in the storage section into pieces of bar-code image data which would have been obtained if the bar-code were read when the reading section was at a preset reference position with respect to the bar-code, based on the moving state detected by the detection section;
    a synthesis section configured to synthesize the pieces of bar-code image data corrected by the correction section to produce synthesized image data; and
    a decode section configured to decode the synthesized image data produced by the synthesis section.

7. A bar-code reading apparatus comprising:
    a reading section configured to sequentially read a bar-code with a movement of a read range with respect to the bar-code to obtain multiple pieces of bar-code data;
    a storage section configured to store the pieces of bar-code data obtained by the reading section;
    a detection section configured to detect a moving state of the reading section in a three-dimensional space;
    a calculation section configured to calculate a moving distance of the reading section required for synthesis of the pieces of bar-code data based on the moving state detected by the detection section;

a synthesis section configured to synthesize the pieces of bar-code data stored in the storage section to produce synthesized bar-code data by combining bar-code data obtained before the reading section moves the moving distance with bar-code data obtained after the reading section moves the moving distance; and a decode section configured to decode the synthesized bar-code data produced by the synthesis section.

8. The bar-code reading apparatus according to claim 7, further comprising:

a correction section configured to correct the pieces of bar-code data obtained by the reading section into pieces of bar-code data which would have been obtained if the bar-code were read when the reading section was at a preset reference position with respect to the bar-code, based on the moving state detected by the detection section, wherein the synthesis section synthesizes the pieces of bar-code data corrected by the correction section.

9. The bar-code reading apparatus according to claim 7, wherein:

the detection section detects the moving state by using a gyro sensor, and the gyro sensor includes an acceleration sensor which detects acceleration of the reading section in the three-dimensional space and an inclination sensor which detects inclination of the reading section caused by moving of the reading section in the three-dimensional space.

10. A non-transitory computer-readable medium having a program stored thereon that is executable by a bar-code reading apparatus which comprises a reading section to sequentially read a bar-code with a movement of a read range with respect to the bar-code to obtain multiple pieces of bar-code data, wherein the program is executable by the bar code reading apparatus to function as:

a reading section configured to sequentially read a bar-code with a movement of a read range with respect to the bar-code to obtain multiple pieces of bar-code data;

a storage section configured to store the pieces of bar-code data obtained by the reading section;

a detection section configured to detect a moving state of the reading section in a three-dimensional space;

a calculation section configured to calculate a moving distance of the reading section required for synthesis of the pieces of bar-code data based on the moving state detected by the detection section;

a synthesis section configured to synthesize the pieces of bar-code data stored in the storage section to produce synthesized bar-code data by combining bar-code data obtained before the reading section moves the moving distance with bar-code data obtained after the reading section moves the moving distance; and a decode section configured to decode the synthesized bar-code data produced by the synthesis section.

* * * * *